United States Patent [19]
Vermolen et al.

[11] Patent Number: 5,924,528
[45] Date of Patent: Jul. 20, 1999

[54] LOAD DEPENDING DAMPING ASSEMBLY

[75] Inventors: Koen Vermolen, Boechout; Jan Carleer; Jan Driessan, both of Vliermaalroot, all of Belgium

[73] Assignee: Tenneco Automotive Inc., Lake Forest, Ill.

[21] Appl. No.: 08/803,200

[22] Filed: Feb. 21, 1997

[51] Int. Cl.$^6$ ................................................. B60G 17/08
[52] U.S. Cl. ............................. 188/266.1; 188/266.6; 188/314; 188/315
[58] Field of Search ..................... 188/314, 315, 188/266.1, 266.5, 266.6, 280, 281, 195

[56] References Cited

U.S. PATENT DOCUMENTS

| | | |
|---|---|---|
| 2,317,271 | 4/1943 | Higley et al. . |
| 2,715,418 | 8/1955 | Van Derbeck . |
| 3,757,910 | 9/1973 | Palmer . |
| 3,771,626 | 11/1973 | Palmer . |
| 4,113,072 | 9/1978 | Plamer . |
| 4,207,914 | 6/1980 | Holloway et al. . |
| 4,749,069 | 6/1988 | Knecht et al. ........................ 188/266.6 |
| 4,955,460 | 9/1990 | Lizell et al. . |
| 4,989,844 | 2/1991 | Wijnhoven et al. . |
| 5,090,524 | 2/1992 | Miller et al. . |
| 5,152,379 | 10/1992 | Sackett et al. . |
| 5,163,538 | 11/1992 | Derr et al. ........................... 188/266.6 |
| 5,163,659 | 11/1992 | Lizell . |
| 5,285,876 | 2/1994 | Shimizu et al. ...................... 188/266.1 |
| 5,392,885 | 2/1995 | Patzenhauer et al. ............... 188/266.6 |

FOREIGN PATENT DOCUMENTS

| | | | |
|---|---|---|---|
| 4206380 | 9/1993 | Germany ............................. 188/266.6 |
| 813703 | 5/1959 | United Kingdom ................ 188/266.6 |

*Primary Examiner*—Matthew C. Graham
*Attorney, Agent, or Firm*—Harness, Dickey & Pierce, PLC

[57] ABSTRACT

A shock absorber having variable damping characteristics for damping the movement of the body of an automobile is disclosed. The shock absorber includes a variable flow control valve which modulates the rate of fluid flow between the upper portion of the shock absorber working chamber and the shock absorber reservoir. The valve is variably controlled in accordance with the vehicle load so that the shock absorber damping characteristic is stiffened during high vehicle load and softened during low vehicle load, thereby varying the damping characteristic to improve vehicle ride and handling.

5 Claims, 3 Drawing Sheets

LOAD DEPENDING DAMPING ASSEMBLY

BACKGROUND AND SUMMARY OF THE INVENTION

This invention relates to a piston-type fluid suspension system and, more particularly, to an assembly for variably adjusting the damping characteristics of the shock absorber during the compression and rebound strokes of the shock absorber piston.

Shock absorbers are used in connection with automobile suspension systems and other vehicle suspension systems to absorb unwanted vibrations which occur during locomotion. To absorb this unwanted vibration, shock absorbers are generally connected between the body and the suspension of the automobile. A piston is located within the shock absorber and is connected to the vehicle body through a piston rod. Because the piston is available to limit the flow of damping fluid within the working chamber of the shock absorber when the shock absorber is compressed or extended, the shock absorber is able to produce a damping force which counteracts the vibration which could otherwise be transmitted from the suspension of the automobile to the body.

A conventional double tube shock absorber comprises a pressure tube with a piston therein and a reserve tube surrounding the pressure tube. A piston rod connected to the piston projects from one end of the pressure tube. At the other end of the pressure tube, a valve communicates with the reserve tube. Damping is controlled by orifices in the piston which regulate passage of fluid from one side of the piston to the other. Due to the presence of a piston rod on only one side of the piston, different volumes of hydraulic fluid must be displaced on the compression and rebound strokes. This difference is termed the rod volume. The rod volume of hydraulic fluid is pushed out of the pressure tube during the compression stroke through the valve in the base of the shock absorber. The hydraulic fluid is then stored in the reserve tube which surrounds the pressure tube of the shock absorber. During the rebound stroke, the fluid which was displaced into the reserve tube through the base valve reenters the pressure tube via the same valve. As the piston moves back and forth within the pressure,tube, the rod volume of oil is correspondingly pushed into and out of the reserve tube through the base valve.

In a typical vehicle, the vehicle load primarily depends upon the number of passengers and the amount of cargo. While vehicle suspension systems are typically designed for a nominal load, the actual load at any point in time will vary. Variations in vehicle load cause corresponding variations in the operation of the shock absorbers. When a vehicle is heavily loaded, the typical shock absorber exerts a diminished damping effect on the suspension system because of the increased inertial force of the higher load. Correspondingly, when the vehicle load is less than the nominal load, the shock absorber typically exerts an increased damping effect due to the reduced inertial force effecting the shock absorber. Present shock absorbers do not compensate for varying vehicle loads and, therefore, the suspension system does not react consistently for different vehicle loads. Therefore, it is desirable to provide a shock absorber having a variable damping force which varies in accordance with the load of the vehicle.

Accordingly, it is a primary object of the present invention to provide a shock absorber in which the amount of damping force generated during compression and rebound of the shock absorber varies in accordance with the vehicle load.

Another object of the present invention is to provide a shock absorber whose damping characteristics can be easily and conveniently controlled in accordance with the vehicle load.

Yet another object of the present invention is to provide a pressure responsive valve which modulates fluid flow between the working chamber and the reserve chamber of a shock absorber in order to vary the damping characteristics of the shock absorber during compression and rebound.

A shock absorber according to the present invention has a control valve for variably controlling the damping characteristic of the shock absorber. According to the principles of the present invention, a pressure tube having first and second ends forms a working chamber for storing damping fluid. A reciprocating piston disposed within the working chamber divides the working chamber into an upper and a lower portion working chamber. The piston allows restricted flow of damping fluid between the upper and lower working chambers. A reserve tube surrounds the pressure tube and defines a fluid reservoir for storing damping fluid between the reserve tube and the pressure tube. A fluid reservoir stores the damping fluid, and the pressure tube is disposed therein. An axially extending piston rod having first and second ends is disposed within the pressure tube and connects to the piston at one end. The other end extends through the upper working chamber out one end of the pressure tube. A base valve controls the flow of damping fluid between the lower working chamber and the fluid reservoir. A control valve variably controls the fluid flow between the upper working chamber and the fluid reservoir.

Advantageously, the variable damping valve operates to vary the damping characteristic of the shock absorber in accordance with the vehicle loading. Further, the damping valve varies the ride characteristics of a car depending upon the vehicle load.

Other objects, advantages, and features of the present invention will become apparent to one skilled in the art upon reading the following description and claims, taken in conjunction with the following drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
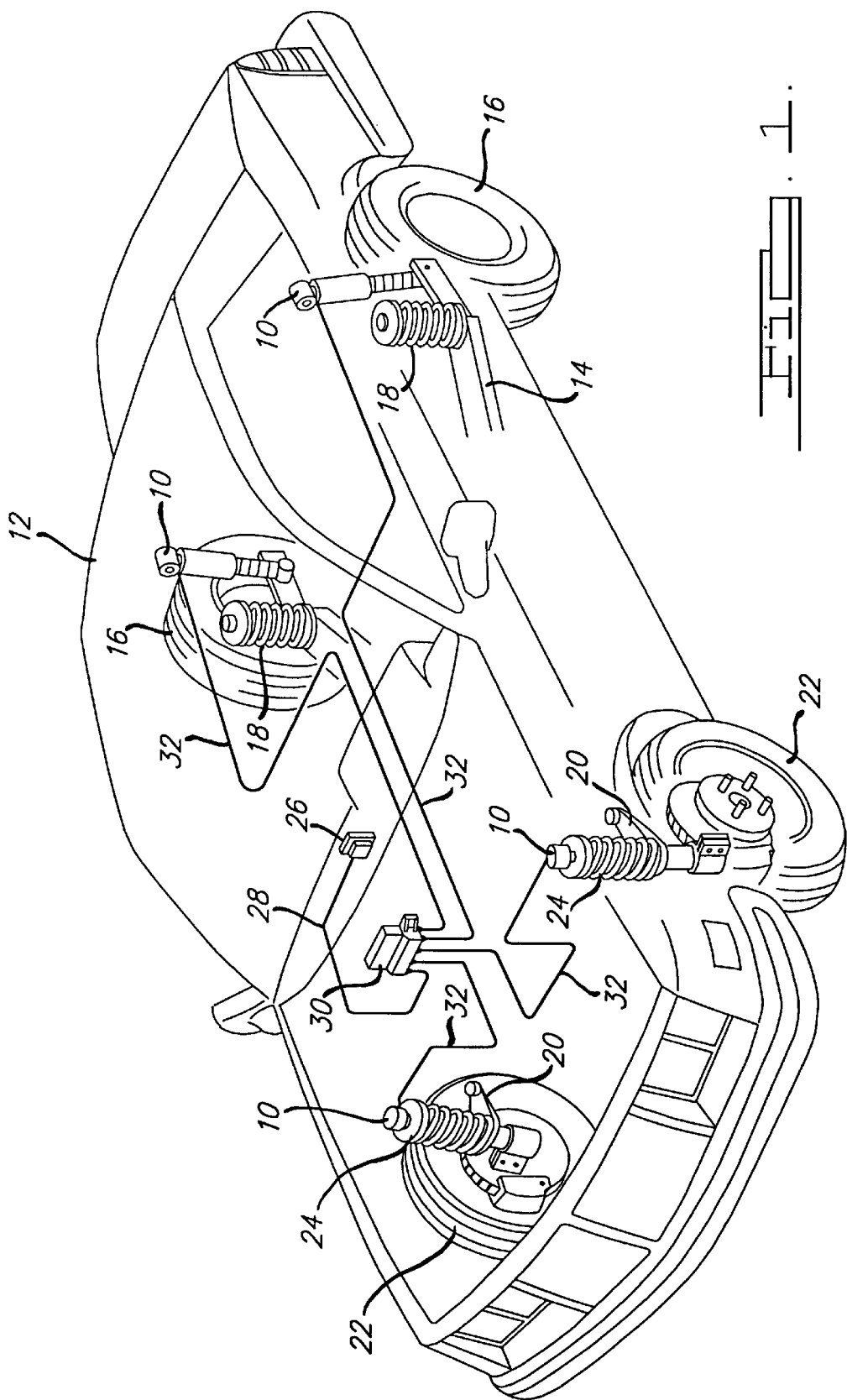
FIG. 1 illusrates an automobile using the method and apparatus for varying the damping of shock absorbers according to of the present invention.
Figure 2:
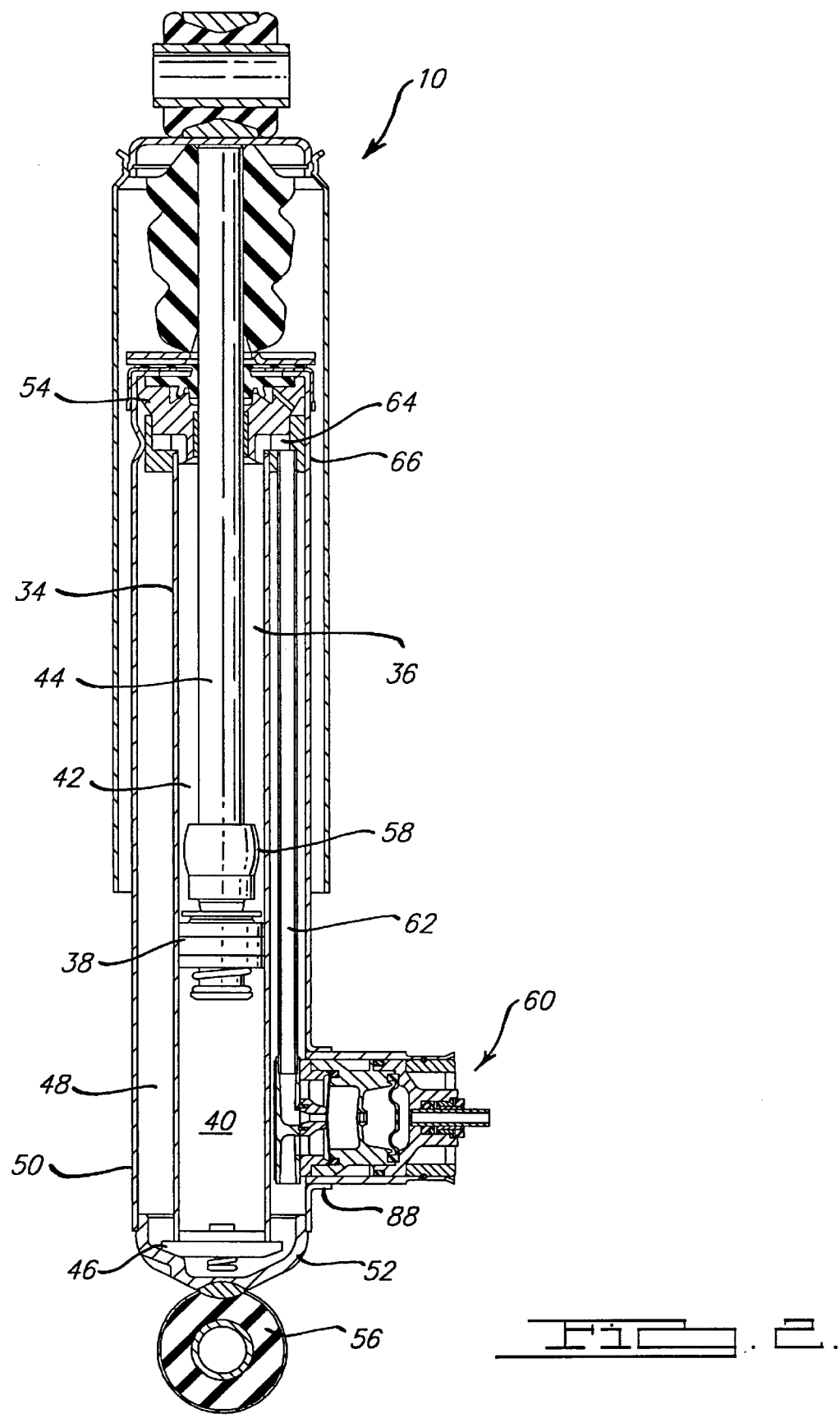
FIG. 2 is a longitudinal cross-sectional view of the shock absorber according to the present invention.
Figure 3:
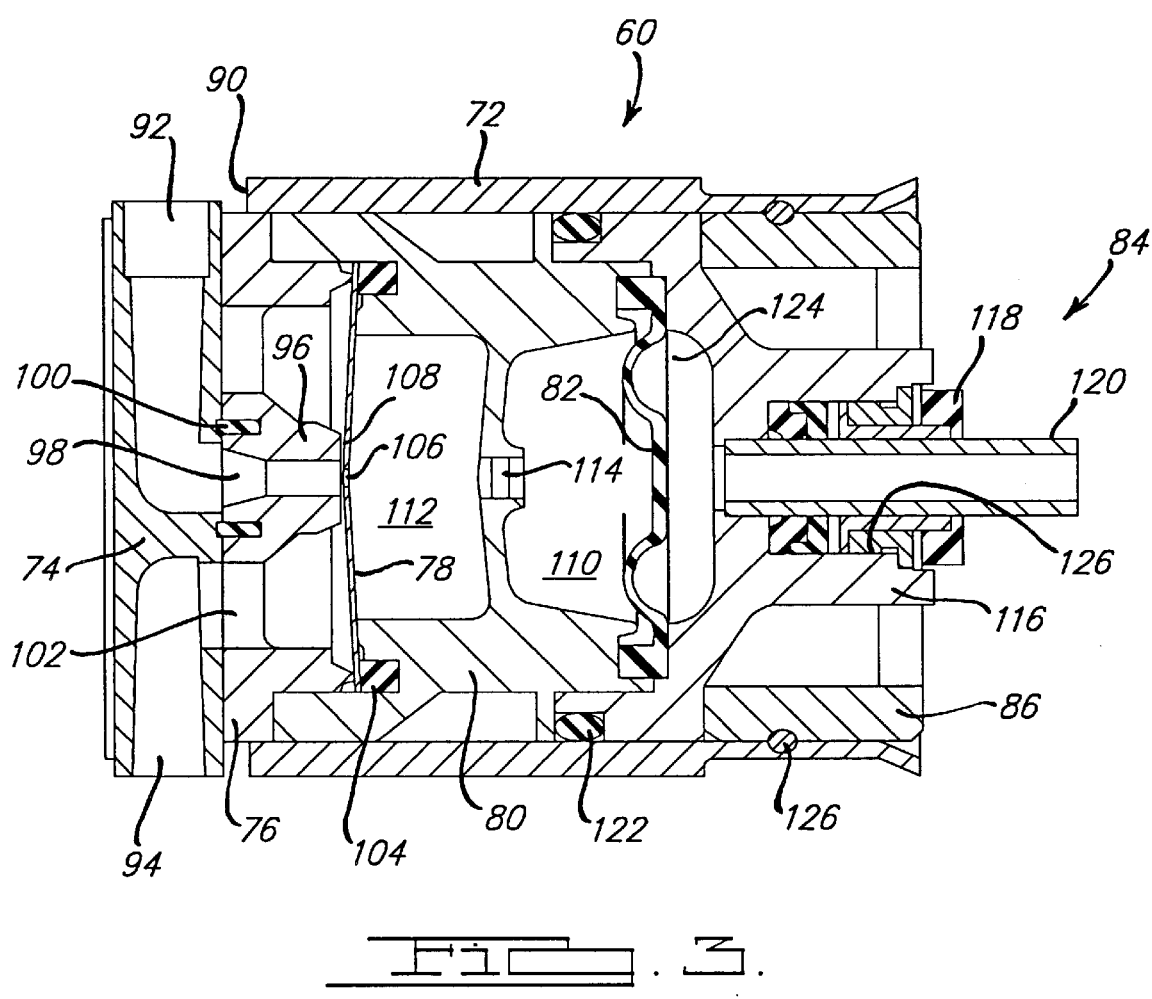
FIG. 3 is an enlarged view of the variable control valve shown in FIG. 2.

Referring now to the drawings in which like reference numerals designate like or corresponding parts throughout the several views, there is shown in FIGS. 1–3 an adjustable shock absorber according to the present invention which is designated generally by the reference numeral 10. Shock absorber 10 is adapted to provide a damping or cushioning effect between sprung and unsprung portions of the undercarriage of an automobile vehicle, or between other interconnected but relatively moveable components of other devices. The term "shock absorber" as used herein refers to shock absorbers in the general sense of the phrase and includes MacPherson struts. Although the present invention is depicted in the drawings as being adapted for various automotive applications, one skilled in the art will readily recognize from the following discussion that the principles of the present invention are equally applicable to other types of suspension systems.

Referring to FIG. 1, four shock absorbers 10 according to the present invention are shown in operative association with a diagrammatic representation of a conventional automobile 12. Automobile 12 includes a rear suspension system 14 having a transversely extending rear axle assembly (not shown) to operatively support the vehicle's rear wheels 16. The rear axle assembly is operatively connected to automobile 12 by means of a first pair of shock absorbers 10 and by a first pair of air springs and/or helical springs 18. Similarly, automobile 12 has a front suspension system 20 including a transversely extending front axle assembly (not shown) to operatively support the vehicle's front wheels 22. The front axle assembly is operatively connected to automobile 12 by means of a second pair of shock absorbers 10 and by a second pair of air springs and/or helical coil springs 24. Shock absorbers 10 serve to dampen the relative movement of the unsprung portion (i.e., the front and rear suspension systems 20 and 14) and the sprung portion of automobile 12.

To allow the damping characteristics of shock absorbers 10 to be controlled in accordance with a varying vehicle load when a helical coil spring is utilized, a load sensor 26 detects the vehicle load and provides a control signal on sensor line 28 to a control module 30. Load sensor 26 is arranged to detect loading of the vehicle's suspension system (not shown) so as to detect the vehicle load. Such a sensor is well known to those skilled in the art. Load sensor 26 provides an output signal to control module 30 which is indicative of the load being carried by front and rear suspension systems 20 and 14. Control module 30 receives the output signal from load sensor 26 and generates a fluid pressure control signal on fluid pressure control lines 32 for controlling damping characteristics of shock absorbers 10. By controlling the damping characteristics of shock absorbers 10, the shock absorbers are able to dampen relative movement between the sprung mass and the suspension system of the automobile and optimize both comfort and road handling ability simultaneously for varying vehicle loads. When air springs are used, shock absorbers 10 are controlled by the air pressure from the air springs. When using air springs, the air spring and shock absorber 10 will be connected to fluid pressure control lines 32. As the load carried by suspension systems 20 and 14 increase, the fluid pressure in the air spring increases with a corresponding increase of fluid pressure to shock absorbers 10. When the load carried by suspension systems 20 and 14 decrease, the fluid pressure in the air springs decreases with a corresponding decrease of fluid pressure in shock absorbers 10.

The structure of the shock absorbers 10 are generally of the type shown and described in conjunction U.S. Pat. No. 4,113,072, issued Sep. 12, 1978, assigned to the assignee of the present invention, and herein incorporated herein by reference. An example of a shock absorber which is similar to the present invention but without the levelling and controlling systems is Monroe Part No. 91.16.73.53. In the discussion which follows, the shock absorber will be described briefly and only to the extent needed to identify the novel features.

With particular reference now to FIG. 2, shock absorber 10 according to the present invention is shown. Shock absorber 10 comprises an elongated pressure cylinder 34 defining a damping fluid containing working chamber 36. A slidably movable piston 38 divides chamber 36 and defines a lower working chamber 40 and an upper working chamber 42. Piston 38 is secured to one end of an axially extending piston rod 44, which passes axially through upper working chamber 42. An example of such a piston may be found with reference to Monroe part number 05.56.55.05.

It is to be understood that piston 38 is described in general terms, and the present invention may be used with a wide variety of piston designs. One such piston is disclosed in the previously identified U.S. Pat. No. 4,113,072, which issued on Sep. 12, 1978.

Shock absorber 10 further comprises a base valve 46 located within the lower end of pressure cylinder 34 which permits the flow of damping fluid into working chamber 42 from an annular fluid reservoir 48 during rebound of shock absorber 10. Annular fluid reservoir 48 is defined as the space between the outer periphery of pressure tube cylinder 34 and the inner periphery of a reservoir tube or cylinder 50. Base valve 46 also enables fluid flow into annular fluid reservoir 48 during compression. In a preferred embodiment, Monroe part number CF 110604 is exemplary of a base valve used in the present invention.

It is to be understood that base valve 46 is described in general terms and the present invention may be used with a wide variety of base valve designs. One such base valve is disclosed in U.S. Pat. No. 3,757,910, issued on Sep. 11, 1973, assigned to the assignee of the present invention, and hereby incorporated by reference.

At the lower end of shock absorber 10, a cup shape lower end cap 52 closes the lower end of reservoir tube 50. The upper end of shock absorber 10 includes a rod guide and seal assembly 54 having an aperture therethrough for passage of piston rod 44. The upper portion of piston rod 44 attaches to vehicle body 12 in a conventional manner. At the lower end of shock absorber 10, a suitable end fitting 56 is secured to the lower end of lower end cap 52 for operatively securing shock absorber 10 to the axle assembly of automobile 12. A rebound bumper 58 is located around piston rod 44 within upper working chamber to cushion shock absorber 10 when it extends to its full rebound position.

Referring to the upper end of shock absorber 10, rod guide and seal assembly 54 seat within reserve tube 50 and pressure cylinder 34. Rod guide and seal assembly 54 limits radial movement of piston rod 44 and provides a fluid seal to prevent fluid from leaking from either of working chamber 36 or reservoir 48 out of shock absorber 10 during reciprocation of piston rod 44. Further, rod guide and seal assembly 54 seals shock absorber 10 from introduction of dirt, dust, or other contaminates into the fluidic portions of the shock absorber 10. Monroe part numbers 01.71.30.68 and 06.05.00.73 are typical examples of rod guide and seal assembly 54 according to a preferred embodiment of the invention.

Also shown in FIG. 2 is a variable valve assembly 60 which fluidly communicates with upper working chamber 42 through a tube 62 and a fluid passage 64 in guide rod and seal assembly 54. Fluid tube 62 has an upper end 66 disposed in proximity to fluid passage 64. Upper end 66 is press fit within rod guide as seal assembly 54 to form a seal which prevents leakage between fluid passage 64 and fluid reservoir 48. Valve assembly 60 also communicates directly with fluid reservoir 48.

FIG. 3 depicts an enlarged view of variable valve assembly 60. Variable valve assembly 60 includes a valve housing 72, an inner valve housing 74, an upper valve housing 76, a shim disc 78, a restriction ring 80, a membrane 82, a cap assembly 84 and a closing ring 86. Valve housing 72 is a generally cup-shaped member that is welded to an aperture 88 extending through reservoir tube 50 as shown in FIG. 2.

Inner valve body 74 is disposed at the closed end of valve housing 72 and is located in a longitudinally extending aperture 90 defined by valve housing 72. Inner valve body 74 extends into reservoir 48 and includes a first aperture 92 which is in fluid communication with fluid tube 62 and a second aperture 94 which is open to reservoir 48. Upper valve body 76 is located adjacent to inner valve body 74. Upper valve body 76 defines a centrally located annular projection 96 which defines aperture 98 which is in fluid communication with first aperture 92 of inner valve body 74. A sealing ring 100 seals the engagement between aperture 98 and aperture 92. Upper valve body 76 also defines an annular chamber 102 which is in fluid communication with second aperture 94 of inner valve body 74.

Restriction ring 80 engages upper valve body 76 and sandwiches shim disc 78 between upper valve body 76 and restriction ring 80. A seal 104 is vulcanized to shim disc 78 and seals the interface between restriction ring 80 and shim disc 78 as well as the interface between upper valve body 76 and shim disc 78. Shim disc 78 defines a hole 106 at its inner side. Due to hole 106, the stiffness for the complete assembly is not the same in both axial directions. Hole 106 and the thickness of shim disc 78 are tuning parameters for shock absorber 10. Shim disc 78 is located above annular projection 96 and with annular projection 96 defines a restriction 108 which restricts the flow of fluid between apertures 92 and 94. Restriction ring 80 defines a pair of oil chambers 110 and 112 which are connected by an aperture 114. Chambers 110 and 112 are completely filled with oil. The sealing for chambers 110 and 112 is provided by shim disc 78 and membrane 82. Aperture 114 is sized to dampen vibrations between disc 78 and membrane 82. The size of restriction 108 will be controlled by the size of hole 106, the thickness of shim disc 78, and the fluid pressure within chambers 110 and 112.

Cap assembly 84 comprises a valve cap 116, an air nipple assembly 118 and a plastic air tube 120. Valve cap 116 engages restriction ring 80 and sandwiches membrane 82 between valve cap 116 and restriction ring 80. An O-ring 122 is located between valve cap 116 and restriction ring 80 and between valve cap 116 and valve housing 72 to seal the oil within valve assembly 60. Valve cap 116 and membrane 82 define a control chamber 124. Air nipple assembly 118 is sealingly disposed within an aperture 126 extending through valve cap 116 and sealingly accepts plastic air tube 120. When plastic air tube 120 is connected to a source of pressurized fluid, the fluid pressure is applied to chamber 124 and thus acts against membrane 82. An increase in pressure in control chamber 124 will move membrane 82 towards shim disc 78 and a decrease in fluid pressure will move membrane 82 away from shim disc 78. The movement of membrane 82 due to an increase or decrease in fluid pressure in control chamber 124 will increase and/or decrease the fluid pressure within chamber 110 with a corresponding increase in fluid pressure within chamber 112 due to aperture 114. This increase and/or decrease in fluid pressure within chamber 112 is in a direct relationship with the fluid pressure within control chamber 124. Thus, when the fluid pressure within chamber 124 increases, fluid pressure within chamber 112 increases. When the fluid pressure within chamber 124 decreases, the fluid pressure within chamber 112 decreases.

The increase in fluid pressure within chamber 112 causes movement of shim disc 78 towards annular projection 96 to reduce the size of restriction 108. This reduction in the size of restriction 108 reduces the flow between upper working chamber 42 and fluid reservoir 48 providing a relatively stiff shock absorber 10. The decrease in fluid pressure within chamber 112 causes movement of shim disc 78 away from annular projection 96 to increase the size of restriction 108. This increase in the size of restriction 108 increases the flow between upper working chamber 42 and fluid reservoir 48 providing a relatively soft shock absorber 10. Thus, the stiffness of shock absorber 10 can be controlled by the amount of fluid pressure supplied to plastic air tube 120, which controls the amount of fluid pressure within control chamber 124, which controls the amount of fluid pressure within chambers 110 and 112 which control the movement of shim disc 78 and the size of restriction 108. The assembly of valve assembly 60 is completed by pressing closing ring 86 into housing 72 to secure the components. Closing ring 86 is held in place by a weld 126.

In operation, variable valve assembly 60 is operable to vary the damping characteristics of shock absorber 10 by varying the fluid flow between upper working chamber 42 and fluid reservoir 48, thereby varying the damping characteristics. By varying the size of restriction 108 and thus the rate of fluid flow between reservoir 48 and upper working chamber 42, the damping characteristic may be increased or decreased. Such modulation varies in accordance with the amount of fluid pressure being supplied to air tube 120 and the design characteristics of the elements described above.

A control pressure is provided to plastic air tube 120 from control lines 32 (shown in FIG. 1). In a preferred embodiment, pneumatic control pressure applied to plastic tube 120 varies in accordance with the load sensed by load sensor 26. The pneumatic control pressure provided to plastic tube 120 is transferred to control chamber 124. The control pressure exerts a force on and translates into flexing of membrane 82. An increase in control pressure results in an increased flexing in membrane 82, and a corresponding decrease in control pressure results in reduced flexing of membrane 82. When the vehicle is heavily loaded, it is desirable to increase the damping characteristics of shock absorber 10. Correspondingly, when the vehicle is relatively lightly loaded, it is desirable to decrease the damping characteristic of shock absorber 10.

In operation, when wheel 16 or 22 rolls over an obstruction, spring 24 is compressed and piston rod 44 and attached piston 38 are driven inwardly into shock absorber 10 to effect compression of shock absorber 10. During compression, fluid passes from lower working chamber 40 through piston 38 and into upper working chamber 42. Fluid in upper working chamber 42 flows through fluid passage 64 into fluid tube 62. Fluid in fluid tube 62 flows into aperture 92 through aperture 98, past restriction 108, through chamber 102 and out aperture 94 into fluid reservoir 48. Fluid in lower working chamber 40 is forced through base valve 46 and into fluid reservoir 48. The fluid flow dampens the compressive action of spring 24 with which shock absorber 10 is associated. Following compression, spring 24 rebounds, thereby extending shock absorber 10 resulting in piston rod 44 extending out from shock absorber 10 at its upper end. During rebound of shock absorber 10, a low pressure area forms in lower working chamber 40, thereby drawing fluid from fluid reservoir 48 through base valve 46 into lower working chamber 40. Correspondingly, fluid in upper working chamber 42 flows through fluid passage 64 into fluid tube 62. Fluid in fluid tube 62 flows into aperture 92, through aperture 98, past restriction 108, through chamber 102, and out aperture 94 into fluid reservoir 48. As has been described and as can be seen, the rate of fluid flow from upper working chamber 42 to fluid reservoir 48 varies in accordance with the amount of fluid pressure being supplied to plastic air tube 120. This fluid pressure varies the rate at which fluid can flow from upper working chamber 42 into fluid reservoir 48 through valve assembly 60 due to the size of restriction 108. By increasing the fluid pressure, the shock absorber damping characteristic is increased, making the shock absorber stiffer. Similarly, by decreasing the fluid pressure, the damping characteristic of shock absorber 10 is decreased, making the shock absorber softer. This increase and decrease of stiffness for shock absorber 10 occurs in both the compression and extension of shock absorber 10.

Thus, when the vehicle load increases, the control pressure applied to plastic air tube 120 correspondingly increases. This increased control pressure displaces membrane 82 in the direction of shim disc 78. Displacement of membrane 82 increases the fluid pressure within chambers 110 and 112 which correspondingly increases the fluid pressure to move shim disc 78 toward annular projection 96 to further restrict the flow between upper working chamber 42 (via fluid tube 62, aperture 92, aperture 98, restriction 108, chamber 102 and aperture 94) to working chamber 48. In a like manner, when the vehicle load decreases, the control pressure applied to plastic air tube 120 decreases correspondingly. The decrease in control pressure displaces membrane 82 away from shim disc 78, thereby decreasing the fluid pressure within chambers 110 and 112. This results in an decreased fluid pressure being applied to shim disc 78 and shim disc 78 will move away from annular projection 96 to increase the size of restriction 108 to increase fluid flow between upper working chamber 42 and fluid reservoir 48.

It will be understood by one skilled in the art that the depiction of load sensor 26 is merely exemplary. In a variation of the above-described invention, a separate load sensor 26 may be individually associated with each shock absorber 10. This enables control of each shock absorber 10 in accordance with the specific vehicle load experienced by that shock absorber. In another variation of the above described invention, the fluid pressure from fluid pressure control lines 32 can be simultaneously supplied to an air spring and shock absorber 10 at each wheel of automobile 12.

It is apparent that the preferred embodiments illustrated and described above are well calculated to fill the objects stated. It will be appreciated, however, that the present invention is susceptible to modification, variation, and change. It is therefore to be understood that within the scope of the appended claims, the invention may be practiced otherwise than as specifically described.

What is claimed is:

1. A shock absorber comprising:
    a pressure tube having first and second ends and forming a working chamber for storing damping fluid;
    a reciprocating piston disposed within the working chamber operable to divide the working chamber into an upper and a lower working chamber, the piston allowing restricted flow of the damping fluid between the upper and the lower working chambers;
    a reservoir tube disposed around said pressure tube, said pressure tube and said reservoir tube defining a fluid reservoir;
    an axially extending piston rod having first and second ends disposed in the working chamber and connected to the piston at one of the ends, the other end extending through the pressure tube;
    a base valve for controlling the flow of damping fluid between the lower working chamber and the fluid reservoir; and
    a control valve for variably controlling the flow of fluid between the upper working chamber and the fluid reservoir, said control valve comprising;
    a valve body having an inlet and an outlet, the inlet fluidly communicating with the upper working chamber, the outlet fluidly communicating with the fluid reservoir;
    a valve housing having an inlet, the inlet fluidly communicating with a control pressure;
    a flexible disk having a first and second side and disposed between the valve housing and the valve body, the flexible disk and the valve housing defining a control chamber on said first side, the flexible disc and the valve body defining a transfer chamber on said second side, the transfer chamber fluidly communicating with the inlet and outlet of the valve body; and an annular projection on the valve body in proximity to the flexible disk and defining a restriction in the transfer chamber;
    whereby an increase in control pressure decreases the restriction and a decrease in control pressure increases the restriction.

2. The shock absorber as set forth in claim 1 further comprising:
    a control valve tube communicating damping fluid between the control valve and the upper working chamber, the control valve tube being disposed within the fluid reservoir; and
    a piston rod guide for guiding the piston rod through the pressure tube, the rod guide having a fluid passage between the upper working chamber and the control valve tube.

3. A shock absorber system for varying the damping characteristics of at least one shock absorber, said shock absorber system comprising:
    a load sensor for sensing a vehicle load, the load sensor providing a control signal varying in accordance with the senses vehicle load;
    a shock absorber including:
        a pressure tube having first and second ends and forming a working chamber for storing damping fluid;
        a reciprocating piston disposed within the working chamber operable to divide the working chamber into an upper and a lower working chamber, the piston allowing restricted flow of the damping fluid between the upper and the lower working chambers;
        a reservoir tube disposed around said pressure tube, said pressure tube and said reserve tube defining a fluid reservoir for storing the damping fluid;
        an axially extending piston rod having first and second ends disposed in the working chamber and connected to the piston at one of the ends, the other and extending through the pressure tube;
        a base valve for controlling the flow of damping fluid between the lower working chamber and the fluid reservoir; and
        a control valve for variably controlling the flow of fluid between the upper working chamber and the fluid reservoir;
    the control valve being responsive to the control signal to vary fluid flow between the upper working chamber and the fluid reservoir, the control valve comprising:
        a valve body having an inlet and an outlet, the inlet fluidly communicating with the upper working chamber, the outlet fluidly communicating with the fluid reservoir;
        a valve housing having an inlet, the inlet fluidly communicating with a control pressure;
        a flexible disk having a first and second side and disposed between the valve housing and the valve body, the flexible disk and the valve housing defining a control chamber on said first side, the flexible disc and the valve body defining a transfer chamber on said second side; the transfer chamber fluidly communicating with the inlet and outlet of the valve body; and an annular projection on the valve body in proximity to the flexible disk and defining a restriction in the transfer chamber;

whereby an increase in control pressure decreases the restriction and a decrease in control pressure increases the restriction.

4. The shock absorber system as set forth in claim 3 further comprising:

a control valve tube communicating damping fluid between the control valve and the upper working chamber, the control valve tube being disposed within the fluid reservoir; and a piston rod guide for guiding the piston rod through the pressure tube, the rod guide having a fluid passage between the upper working chamber and the control valve tube.

5. A shock absorber comprising:

a pressure tube having first and second ends and forming a working chamber for storing damping fluid;

a reciprocating piston disposed within the working chamber operable to divide the working chamber into an upper and a lower working chamber, the piston allowing restricted flow of the damping fluid between the upper and the lower working chambers;

a reservoir tube disposed around said pressure tube, said pressure tube and said reservoir tube defining a fluid reservoir for storing the damping fluid;

an axially extending piston rod having first and second ends disposed in the working chamber and connected to the piston at one of the ends, the other end extending through the pressure tube;

piston rod guide means for guiding the piston rod through the pressure tube during translational motion, the rod guide having a fluid passage between the upper working chamber and the fluid reservoir;

a base valve for controlling the flow of damping fluid between the lower working chamber and the fluid reservoir;

a control valve tube communicating damping fluid between a control valve and the upper working chamber, the control valve tube being disposed within the fluid reservoir;

the control valve including a control pressure inlet receiving a control pressure varying in accordance with a specified parameter and a control chamber at the control pressure, the control chamber varying a restriction between the control valve tube and the fluid reservoir in accordance with the control pressure, the control valve comprising:

a valve body having an inlet and an outlet, the inlet fluidly communicating with the upper working chamber, the outlet fluidly communicating with the fluid reservoir;

a valve housing having an inlet, the inlet fluidly communicating with a control pressure;

a flexible disk having a first and second side and disposed between the valve housing and the valve body, the flexible disk and the valve housing defining a first chamber on said first side, the flexible disc and the valve body defining a transfer chamber on said second side, the transfer chamber fluidly communicating with the inlet and outlet of the valve body; and an annular portion on the valve body in proximity to the flexible disk and defining the restriction passage in the transfer chamber;

whereby an increase in control pressure decreases the restriction and a decrease in control pressure increases the restriction.

* * * * *

UNITED STATES PATENT AND TRADEMARK OFFICE
CERTIFICATE OF CORRECTION

PATENT NO. : 5,924,528
DATED : July 20, 1999
INVENTOR(S) : Koen Vermolen et al

It is certified that error appears in the above-identified patent and that said Letters Patent is hereby corrected as shown below:

Title page, [56] References Cited, US Pat 4,113,072, "Plamer" should be --Palmer--

Col. 1, line 39, "pressure,tube" should be --pressure tube--

Col. 2, line 42, delete "of"

Col. 3, line 49, after "conjunction" insert --with--

Col. 3, line 51, delete 1st occurrence of "herein"

Col. 7, line 23, delete "an" and substitute --a-- therefor

Col. 7, line 67, claim 1, "comprising;" should be --comprising:--

Col. 8, line 12, claim 1, after "and" make a paragraph break

Col. 8, line 33, claim 3, delete "senses" and substitute --sensed-- therefor

Col. 8, line 44, claim 3, delete "reserve" and substitute --reservoir-- therefor Col. 8, line 48, claim 3, delete "and" and substitute --end-- therefor Signed and Sealed this Second Day of May, 2000

Attest:

Attesting Officer

Q. TODD DICKINSON

Director of Patents and Trademarks